(12) United States Patent
Diggins

(10) Patent No.: US 8,743,968 B2
(45) Date of Patent: Jun. 3, 2014

(54) METHOD AND APPARATUS FOR ANALYSING IMAGE DATA TO QUANTIFY PRIOR BLOCKBASED PROCESSING OF THE DATA

(75) Inventor: Jonathan Diggins, Chesham (GB)

(73) Assignee: Snell Limited, Berkshire (GB)

( * ) Notice: Subject to any disclaimer, the term of this patent is extended or adjusted under 35 U.S.C. 154(b) by 282 days.

(21) Appl. No.: 13/324,260

(22) Filed: Dec. 13, 2011

(65) Prior Publication Data

US 2012/0155548 A1    Jun. 21, 2012

(30) Foreign Application Priority Data

Dec. 16, 2010   (GB) .................................. 1021394.0

(51) Int. Cl.
*H04N 7/26* (2006.01)
(52) U.S. Cl.
USPC .................................................... 375/240.26
(58) Field of Classification Search
USPC .................................................... 375/240.26
See application file for complete search history.

(56) References Cited

U.S. PATENT DOCUMENTS

| 2009/0245675 A1 | 10/2009 | Aoyama et al. |
| 2010/0226573 A1* | 9/2010 | Lertrattanapanich et al. ............................ 382/168 |

FOREIGN PATENT DOCUMENTS

| EP | 2139240 | 12/2009 |
| GB | 2437337 | 10/2007 |
| WO | 2005015915 | 2/2005 |
| WO | WO 2005015915 A1 * | 2/2005 |
| WO | 2007125286 | 11/2007 |

OTHER PUBLICATIONS

Sangkeun Lee "Edge Statistics based Image Scale Ratio and Noise strength Estimation in DCT Coded Images" IEEE Transactions on Consumer Electronics, vol. 55, No. 4 Nov. 2009, pp. 2139-2144.*
Lee, S., "Edge Statistics-based Image Scale Ratio and Noise Strength Estimation in DCT-coded Images," IEEE (2009) 6 pages.
EP11190838 Extended European Search Report and Written Opinion dated Mar. 5, 2012, 8 pages.
GB10213940 European Search Report, dated Apr. 14, 2011, 3 pages.

* cited by examiner

*Primary Examiner* — Sath V Perungavoor
*Assistant Examiner* — Jeffery Williams
(74) *Attorney, Agent, or Firm* — Michael Best & Friedrich LLP

(57) ABSTRACT

A method of analyzing image data to quantify prior block-based processing comprises processing a set of pixel values derived from the image data to generate a spatial difference profile along a line perpendicular to assumed block edges, the spatial difference profile representing differences between values of pixels spaced spatially in a direction parallel to said line; summing the spatial difference profile in a direction perpendicular to that line; measuring inter-maxima distances in the spatial difference profile to a fractional precision in pixel spacing units; and aggregating measured inter-maxima distances to determine a block size.

19 Claims, 3 Drawing Sheets

METHOD AND APPARATUS FOR ANALYSING IMAGE DATA TO QUANTIFY PRIOR BLOCKBASED PROCESSING OF THE DATA

CROSS-REFERENCE TO RELATED APPLICATIONS

This patent application claims foreign priority to United Kingdom Patent Application No. 1021394.0 filed Dec. 16, 2010, which is incorporated herein by reference in it's entirety.

BACKGROUND OF THE INVENTION

1. Field of the Invention

This invention concerns image analysis of video signals or data in order to detect prior, block-based processing and to quantify block-related picture impairments.

2. Description of the Related Art

It is very common for video or image processing techniques to make use of "block-based" processing in which the image is divided into equal sized regions and the pixels within each region are processed together. A good example is the video compression method in which a transform is applied separately to each of a regularly structured set of blocks of pixels and each block is represented (for transmission or storage) by a set of transform coefficients. When different processing is applied to the different blocks, for example different quantisation of transform coefficients, the block structure can become visible as an image artefact because the spatial frequency response of the transmission system varies from block to block.

In broadcasting and multimedia content creation and distribution it is frequently desirable to check the subjective quality of video and image data, and in particular, automatic methods of assessing subjective quality are increasingly being sought for economic reasons. Video quality analysis methods fall into two types: "double-ended" methods where the processed images are compared with unprocessed images to identify artefacts; and, "single-ended" methods in which the processed images are analysed without reference to unprocessed images. Double-ended methods are usually only applicable to a research and development environment; single-ended methods are preferable in normal commercial production and distribution operations.

There are a number of known methods for automatically analysing subjective "blockiness" or block artefacts. In this context, "blockiness" or block artefacts are a measure of the subjective impairment of the images due to the block-based processing. Generally these methods require prior knowledge of the positions of the block boundaries or the size of the blocks. For example: if the boundary positions are known, average luminance or chrominance differences can be evaluated across the boundaries; and, if the size of the blocks is known, inter-pixel differences can be evaluated in a repeating pattern with a periodicity equal to the block size.

The need for prior knowledge of the block structure severely limits the usefulness of these methods. It is not unusual for images to undergo spatial transformations, such as aspect ratio-conversion in which the block size is changed; these processes may be cascaded and block-based compression or processing may be applied at any point in the signal chain. An image may therefore have been subjected to a number of different block-based processes with arbitrary block sizes and boundary positions; and, there may be more than one set of block-based artefacts present with different block structures for the different sets of artefacts.

One known approach is shown in WO 2007/125286 to which reference is directed.

It is also important, particularly if large numbers of channels are to be monitored from this and other quality aspects, for the block size to be determined accurately but in a manner which makes efficient use of processing resources. If the monitoring is to be performed in real-time, it is usually also important for the delay or latency that is introduced by the processing to be as small as possible. Once a block size has been determined—this itself of course indicating the past block-processing of the video—a variety of techniques, including the known techniques mentioned above, may be employed for quantifying block based artefacts.

SUMMARY OF THE INVENTION

The invention comprises a novel method of image analysis in which size of processing blocks can be measured accurately, efficiently and with low delay.

In one aspect, there is provided a method of analysing image data in an image processor to quantify prior block-based processing of the data, the method comprising the steps of: processing a set of pixel values derived from said image data to generate a spatial difference profile along a line perpendicular to assumed block edges, the spatial difference profile representing differences between values of pixels spaced spatially in a direction parallel to said line; summing the spatial difference profile in a direction perpendicular to said line; measuring inter-maxima distances in said spatial difference profile to a fractional precision in pixel spacing units; and aggregating measured inter-maxima distances to determine a block size.

The step of measuring inter-maxima distances in said spatial difference profile may comprise the step of using a moment based detector to detect peaks to a fractional precision in pixel spacing units. The step of aggregating measured inter-maxima distances may comprise histogramming the differences. An analysis may be conducted for missing peaks according to an interim detected block size. The spatial difference profile may be generated by a high-pass filter or band-pass filter. A second spatial difference profile may additionally be provided, the second spatial difference profile representing differences between values of pixels spaced by a greater distance spatially in a direction parallel to said line, with use of the first or second spatial difference profile being selected according to confidence in a determined block size.

In another aspect there is provided apparatus for analysing image data to quantify prior block-based processing of the data, comprising: a first filter for processing a set of pixel values derived from said image data to generate a first spatial difference profile along a line perpendicular to assumed block edges, the spatial difference profile representing differences between values of pixels spaced spatially in a direction parallel to said line; an accumulator for summing the first spatial difference profile in a direction perpendicular to said line; a peak detector and distance measurement block for measuring inter-maxima distances in said summed spatial difference profile to a fractional precision in pixel spacing units; an aggregator for aggregating measured inter-maxima distances; and a block size determinator operating on said aggregated measured inter-maxima distances to determine a block size.

The peak detector may comprise a moment based detector to detect peaks to a fractional precision in pixel spacing units. The aggregator may serve to histogram the differences. The peak detector may be configured to conduct an analysis for missing peaks according to an interim detected block size. The first filter may be a high-pass filter or band-pass filter. The apparatus may further comprise a second filter for processing a set of pixel values derived from said image data to generate a second spatial difference profile along a line perpendicular to assumed block edges, the second spatial difference profile representing differences between values of pixels spaced spatially in a direction parallel to said line by a distance which is greater than the corresponding distance in the first spatial difference profile. Use of the first or second spatial difference profile may be selected according to confidence in a determined block size.

The invention may used to analyse image data representing values associated with pixels of an image. The values may represent luminance, colour difference (e.g. $C_B$ or $C_R$), primary colour component (e.g. R, G or B) or any other convenient pixel parameter. Analogue video signals may be sampled to obtain pixel values for analysis.

In simple overview, the method disclosed is based on histogramming (or aggregating in other appropriate ways) the inter-maxima distances between members of a set of unidirectional spatial sums of filtered pixel values (or other spatial difference profile). In the description which follows, the horizontal characteristics of the block-based impairment are analysed and the summation direction is vertical. Other directions may be analysed; for example, filtered horizontal sums of pixel values are used when determining vertical characteristics of block-based impairment. Using a moment-based maxima detector, or other detector that identifies peaks in the filtered sum to fractional pixel position precision, and, for example, histogramming these distances, one can determine the block size to fractional precision. Preferably error feedback techniques are employed. In this way, a reliable and precise block size measure can be obtained with considerably less processing resource than in prior art approaches.

Having detected the block size, the block phase can be determined from analysis of the filtered spatial difference profile in accordance with the detected block size. The analysis methods disclosed in the art mentioned above can be used.

Figure 1:
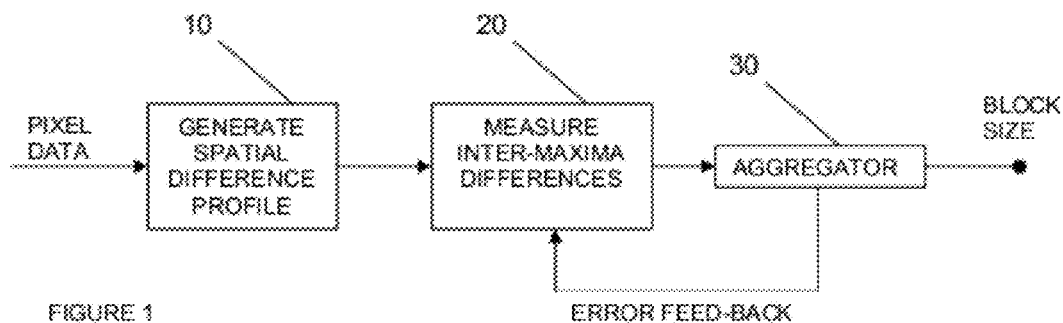
FIG. 1 shows in block diagram form an image analysis system according to an embodiment of the invention.

Referring now to FIG. 1 there is shown in diagrammatic overview, a system according to one embodiment of the present invention.

Pixel data is provided to block (10) in which a spatial difference profile is generated. This can, in one form, be generated by taking the absolute magnitude of differences between neighbouring pixels. More conveniently, a spatial filter can be employed that removes lower frequencies. Usually, horizontal profiles will be summed over a number of lines or vertical profiles will be summed over a number of columns (depending upon whether horizontal or vertical block sizes are being determined). This sum may be over the entire picture. The profile sum is then passed to block (20) in which peaks are detected and then the distance between those peaks measured. It is important that this is done to fractional precision. The peaks can be detected—for example—by a moment-based detector. The various inter-peak distances are then aggregated in block (30) to derive a block size. The aggregation can be a statistical operation such as taking a mean or a median, but better results can in many applications be achieved by histogramming to take a modal value. As will be later exemplified, a form of error feedback can be very helpful in further improving the reliability and the robustness of the measure.

Figure 2:
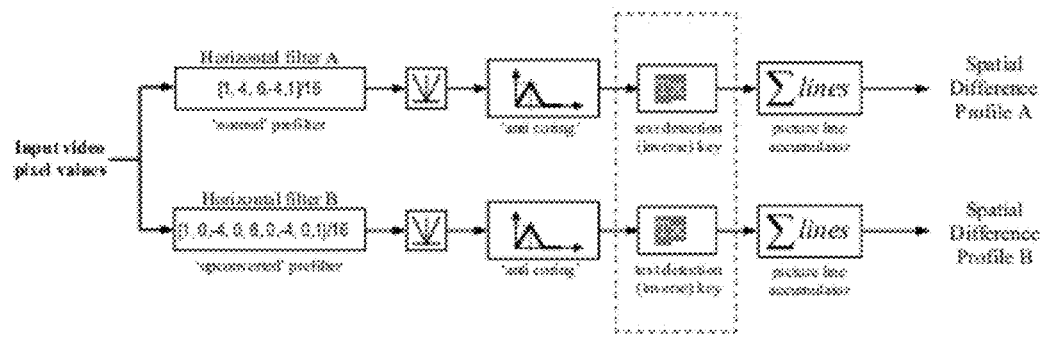
FIG. 2 shows a first part of an image analysis system according to an embodiment of the invention.
Figure 3:
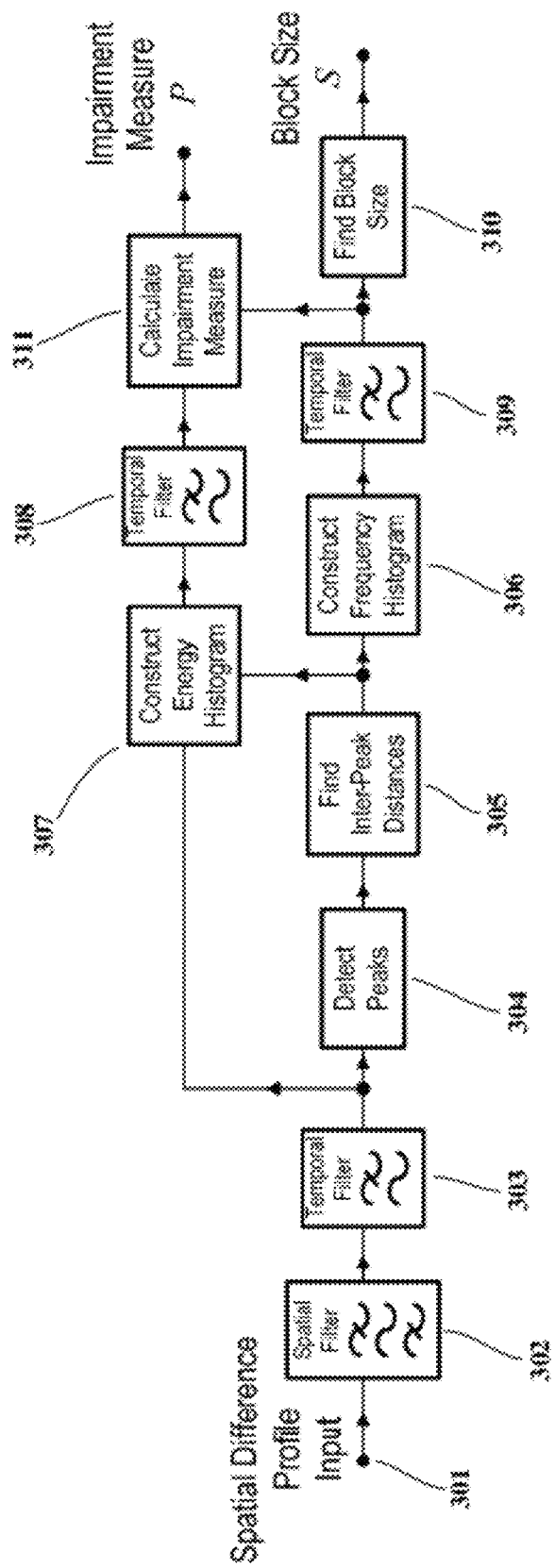
FIG. 3 shows a second part of an image analysis system according to an embodiment of the invention; and, FIG. 4 is a diagram of the frequency response of a filter for use in the invention.

Turning now to an example of a detailed implementation of the invention, FIGS. 2 and 3 show a block diagram of a system according to one embodiment. Briefly, two different high-pass FIR spatial pre-filters (A & B) are used, each to produce a spatial difference profile, and both of these processed to detect the inter-maxima distances. One filter (A) is designed for video having undergone essentially no upscaling after block-based-processing, and its output is used to provide a spatial difference profile that (effectively) represents the spatial differences between adjacent pixels. The other filter (B) assumes that upconversion has taken place and is used to provide a spatial difference profile that (effectively) represents spatial differences between more widely spaced pixels. The detection of inter-maxima distances takes place in FIG. 3. For each prefilter this leads to a block size estimate, S, and an image impairment measure P.

The height of each peak is recorded as a function of (integer-pixel) inter-peak distance. This generates a histogram-like output in the sense that there are bins corresponding to expected block sizes (typically in the range 6 to 25 pixels). Each bin contains the sum of maxima values for that inter-peak size; and, the accumulated value in each bin represents the 'pixel-difference energy' of that block size. This set of values will be referred to as the 'energy histogram' below.

A second histogram that describes the frequency of occurrence of peaks with respect to integer pixel inter-peak distance values is also created. This will be referred to as the 'frequency histogram' below. It is analysed to determine the block size, S. The creation of this histogram involves error feedback—which is very helpful—and this stage of the process can also entail a test for missing peaks in an otherwise regionally periodic set of maxima. The full description follows below, but the size determined from the frequency histogram is used to identify a bin in the energy histogram. This bin, and its immediate neighbours, are summed to yield a peak energy or peak activity measure, P, for the detected size. This measure is characteristic of block-based image impairment.

The size S and peak energy P corresponding to each pre-filter branch (A or B) are then used in a simple test that generates a "block-processed"/"not-block-processed" decision. If block-based processing is detected (typically indicating prior data compression) a decision is made as to which of the two pre-filter filter branches is to be used.

Referring now to the figures in more detail, the filtering, rectifying, anti-coring, keying-out (that is to say removal) of text regions, and vertical summing stages of the method, are shown in FIG. 2. The function of the filters is to remove the DC component of the pixel value data so that inter-pixel difference information is obtained. The filter coefficients shown in FIG. 2 correspond to high-pass filters rejecting the lower part of the signal spectrum. The 'anti-coring' function rejects large amplitude signals and retains lower-amplitude information. For example pixel values less than 5% of the nominal peak white level could be passed without modification, values in the range 5% to 10% could be attenuated, and values greater than 10% of the peak white level replaced by zero.

The operations to be performed on each of the outputs from FIG. 2 are shown in FIG. 3. The spatial difference profile (301) represented by the summed linestore is spatially filtered with a band-pass filter (302) intended to pass information only in a range of probable block sizes. A suggested filter is:

$$z_n = -(L_{n-4} + 2L_{n-3} + L_{n-2}) + 2(L_{n-1} + 2L_n + L_{n+1}) - (L_{n+2} + 2L_{n+3} + L_{n+4})$$

Where: $z_n$ is the output of the filter at pixel position n; and,
$L_n$ is the filter input value at pixel position n.

Figure 4:
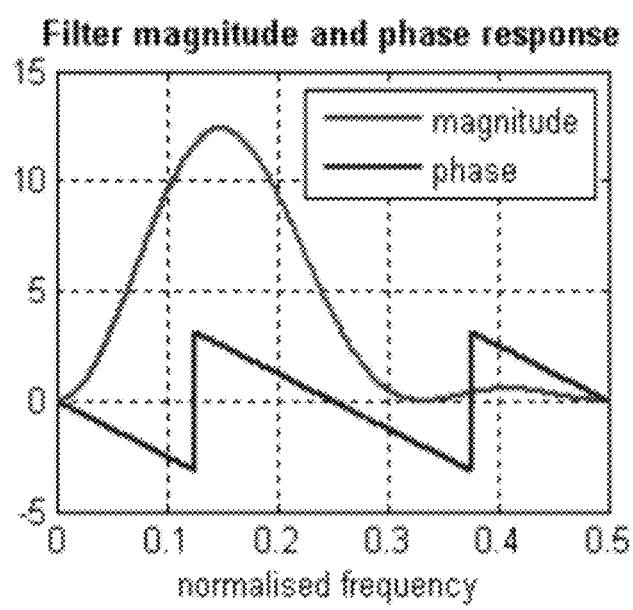

The response of the above filter is shown in FIG. 4; the filter gain is arbitrary. (The phase response is shown in the figure for completeness but need not be linear as shown.) The filtering step can be omitted if there is no a priori information on a range of probable block sizes.

The entire filtered spatial difference profile is then recursively filtered (303) in the temporal direction, using a simple first order filter, $$y_n(t) = \{z_n(t) + 7y_n(t-1)\} \div 8 \quad \text{(Eqn 1)}$$

Where: $y_n(t)$ is the filter output at time t; and,
$z_n(t)$ is the filter input at time t;

This temporal filtering is again optional. If used, it can usefully be combined with known shot-detection to avoid temporal filtering across a cut between unrelated images.

The optionally filtered set of summation values is then tested (304) to detect peaks. Using the notation $y_n$, to represent members of the set of values in the spatial difference profile, where the subscript n represents pixel position in units of pixel pitch perpendicular to the direction of summation, a suitable test is:

Clear Peak=$(y_n > y_{n+1})$ AND $(y_n > y_{n-1})$

DoubleMax Peak=$(y_n = y_{n-1})$ AND $(y_n > y_{n+1})$ AND $(y_{n-1} > y_{n-2})$ Overall peak detection=(Clear Peak OR DoubleMax Peak) AND $(y_n > 0)$ AND $(y_{n+1} > 0)$ AND $(y_{n-1} > 0)$ (Eqn 2)

This identifies (integer) pixel position indices, n, along the linestore that are at, or close to, maxima. To determine the maxima more accurately—to sub-sample precision—a moments calculation is used, which determines the 'centroid' of the set of five spatial difference profile values centered on the pixel position n.

For a given n which satisfies the overall peak detection condition above, the local $y_n$ is clipped at zero:

If $y_n > 0$ $s_n = y_n$

Else $s_n = 0$ (Eqn3)

Where: $s_n$ is the clipped value.
Then the position of the peak is determined with sub-pixel resolution as follows:

Let:

$N = (n-2)s_{n-2} + (n-1)s_{n-1} + (n)s_n + (n+1)s_{n+1} + (n+2)s_{n+2}$ and $S = s_{n-2} + s_{n-1} + s_n + s_{n+1} + s_{n+2}$ Then:

$F = N/S$ (Eqns 4)

Where: F is the peak position in pixel-pitch units.

The set of values of F (for values of n satisfying the above test) are used to measure the inter-maxima distances. The set is processed in an inter-peak-distance evaluation block (305). The resulting inter-peak distances are processed in a frequency histogram determination block (306), using error feedback, to derive an integer-pixel-resolution histogram of the frequencies of occurrence of inter-peak distances. The process is as follows:

The inter-peak distances are evaluated in turn, starting by locating the peak $F_1$ closest to the first pixel position (n=1) in the spatial difference profile, and incrementing n until the next peak $F_2$ is found. The first inter peak distance $\Delta_1$ is given by:

$\Delta_1 = F_2 - F_1$

The integer part of $\Delta_1$ is used to identify a histogram bin, and that bin value is incremented by one. The fractional part of $\Delta_1$ is retained as an error-feedback term.

The value of n is then incremented until the next peak $F_3$ is found. The second inter-peak distance $\Delta_2$ is then evaluated:

$\Delta_2 = F_3 - F_2$

The error-feedback term (the fractional part of $\Delta_1$) is added to $\Delta_2$ and the histogram bin corresponding to the integer part of the result is incremented. The fractional part of the result is retained as the error-feedback term for the next inter-peak distance.

This process continues until all peaks $F_p$ have been counted. If there are p peaks, then the total content of all the histogram bins will be (p−1).

It is not uncommon for a peak to be missed. That is, among a group of regularly spaced maxima in the summed linestore, a location which one anticipates should contain a maximum does not. There are a variety of reasons why this happens but whatever the cause it is beneficial to the blocking detection process to identify that a peak has been missed and compensate accordingly. To do this, adjacent inter-peak distances can be evaluated and tested:

$d_0 = F_p - F_{p-1}$ $d_1 = F_{p-1} - F_{p-2}$ $d_2 = F_{p-2} - F_{p-3}$ $d_3 = F_{p-3} - F_{p-4}$

To establish whether there is a missing peak in the interval between $F_{p-1}$ and $F_p$, the difference of differences of the three previous inter-peak distances are evaluated:

$D_{1-2} = |d_1 - d_2|$ $D_{1-3} = |d_1 - d_3|$ $D_{2-3} = |d_2 - d_3|$

Where |x| is the magnitude of x.

If these three differences of differences are all less than two pixel pitches, and their average value is close to half of $d_0$ then it can be assumed that there is a missing peak in the interval between $F_{p-1}$ and $F_p$.

The 'missing' peak is assumed to lie mid-way between the detected peaks having the 'double-width' inter-peak distance. The frequency histogram should include contributions from any 'missing' peaks. They cannot contribute to the energy histogram because, by definition, they have unknown energy.

As explained above, the process of peak detection and the construction of the energy and frequency histograms is conducted separately on the two, differently filtered, spatial difference profiles. Some constraints are imposed on the range of acceptable inter-peak distance values for the two signal paths:

For the prefilter A path (having spatial filter coefficients [1,−4,6,−4,1]) only sizes in the range 6 to 15 are accepted.

For the prefilter B path (having spatial filter coefficients [1,0,−4,0,6,0,−4,0,1]) only sizes in the range 10 to 25 are accepted.

This is because—generally speaking—the block edge energies that pass through the two filters are in these approximate ranges. Imposing these limits is both intuitive and helps reduce false alarms due to spurious effects.

Returning to FIG. 3, the energy histogram is constructed (307) by summing the (clipped) spatial difference profile values $s_n$ in histogram bins according to the inter-peak distance value determined by the inter-peak distance evaluation block (305). For each detected peak that contributes to the frequency histogram, the corresponding $s_n$ value is added to the bin identified by the integer part of the defence value $F_n$.

Once all pixel positions n have been processed, and the end of the linestore is reached, the histogram gathering part of the process is complete.

The energy histograms from the block (307) are temporally filtered by a temporal filter (308), and the frequency histograms from the block (306) are filtered by a temporal filter (309). These filters recursively combine histograms from successive images in a sequence of images. Both filters can have the same characteristics as the recursive filter (303) described by Equation 1. This can be justified on the assumption that the block structure should not vary continuously over time—except perhaps to jump discontinuously at a shot change, between unrelated images. (Typically, a 'shot change reset' is often included to avoid the combination of data from unrelated images.) But on the whole, temporal changes are likely to be content-dependent rather than being caused by the block-based processing, and some recursive temporal filtering of the histograms is beneficial.

The recursively filtered histograms from the 'A' and prefilter branches, are used to derive respective block-size parameters S and block-impairment parameters P.

The size parameter S is found in a block size determination process (310) that operates on the temporally filtered frequency histogram from the temporal filter (309). The process is a normalised, moments-based calculation, centred on the maximum value bin:

$$S=\{(i-2)H_{i-2}+(i-1)H_{i-1}+iH_i+(i+1)H_{i+1}+(i+2)H_{i+2}\}\div\{H_{i-2}+H_{i-1}+H_i+H_{i+1}+H_{i+2}\} \quad \text{Eqn. 5}$$

Where: $H_i$ is the content of bin i of the frequency histogram; and, i is the index value corresponding to the maximum value bin The block-impairment parameter P is found in a block impairment determination process (311) that operates by summing three adjacent bins of the filtered energy histogram from the temporal filter (308):

$$P=E_{i-1}+E_i+E_{i+1} \quad \text{Eqn. 6}$$

Where: $E_i$ is the content of bin i of the energy histogram; and, i is the index value corresponding to the maximum value bin of the frequency histogram.

Note: to avoid anomalous results arising from empty histogram bins, a minimum bin value of unity is imposed.

From the results of equations 5 and 6 above for P and S, either the results of processing the spatial difference profile from filter A, or the results of processing the spatial difference profile from filter branch B, are selected for output. The selection is made according to a figure of merit V, obtained for each signal path as follows:

$$V_A=S_A \times P_A$$

$$V_B=S_B \times P_B$$

if $(V_A>V_B$ AND $S_A<14.5\Omega)$ $\text{Use}_A=1,\text{Use}_B=0 \rightarrow P=P_A,S=S_A,\text{Max}=\text{Max}_A$ else if $(V_B>V_A$ AND $S_B>10.5\Omega)$ $\text{Use}_A=0,\text{Use}_B=1 \rightarrow P=P_B,S=S_B,\text{Max}=\text{Max}_B$ else if $(S_A<10.5\Omega)$ $\text{Use}_A=1,\text{Use}_B=0 \rightarrow P=P_A,S=S_A,\text{Max}=\text{Max}_A$ else if $(S_B>14.5\Omega)$ $\text{Use}_A=0,\text{Use}_B=1 \rightarrow P=P_B,S=S_B,\text{Max}=\text{Max}_B$ else $\text{Use}_A=0,\text{Use}_B=0 \rightarrow P=0,S=1,\text{Max}=\text{don't care} \quad \text{Eqns. 7}$ Where:
the subscripts $_A$ and $_B$ indicate data relating to the respective, differently-filtered signal paths;

$\Omega$ is a constant chosen to suit the number range of the processing; and, the flags $\text{Use}_A$ and $\text{Use}_B$ indicate the respective validities of the results from the two signal paths.

The "block-processed"/"not-block-processed" decision is made from the chosen, valid path, by comparing the respective value of P with a threshold, if $((P>Th)$ AND $(\text{Use}_A$ OR $\text{Use}_B))$ compressed_flag=1 else compressed_flag=0 $\quad \text{Eqn. 8}$

Where: the threshold Th is nominally 60,000 times the number of lines of pixels summed to create the spatial difference profile. Th may be user-adjustable. And, compressed_flag indicates the presence or absence of block-based processing.

Note that where no block based processing is detected the block size value S has no meaning.

To identify the block edges, it is necessary to identify the block phase. There is no guarantee that the block structure is aligned in any particular manner, and it is often helpful to identify the specific alignment. This is to say, to determine which peaks in the summed filtered linestore correspond to block edges, which are spurious peaks due to picture content, and whether any block edge locations have absent peaks. This can be done by identifying the phase of a spatial frequency component in the filtered spatial difference profile having a pitch corresponding to the determined block size S, or as disclosed in the above reference.

It can be seen from the above description that the invention enables block size and a measure of block-related image impairment to be determined by simple processes performed on pixel values. It is thus highly suitable for real time applications and applications where processing resources are limited.

The above description is based on a streaming process using dedicated functional blocks. The skilled person will appreciate that it may be implemented in other ways, for example as a set of instructions carried out by a processor.

The invention is not restricted to horizontal or vertical analysis; data from pixels along any straight line in an image can be analysed. In some circumstances (e.g. where the block-size is large relative to the pixel pitch) it may be convenient to spatially sub-sample the pixels prior to processing (with or without associated pre-filtering or interpolation).

A range of features and process steps have been described in a variety of combinations, configurations and orders. It should be understood that those features and process steps may in various applications be deployed with advantage in other combinations, configurations and orders.

The invention may be used to analyse data corresponding to still or moving images, and the data may be derived from computer files or other storage media. The time to analyse an image, or part of an image, may be faster or slower than the length of time for which that image is intended to be presented to a viewer.

The invention claimed is:

1. A method of analysing image data in an image processor to quantify prior block-based processing of the data, the method comprising the steps of:
processing a set of pixel values derived from said image data to generate a spatial difference profile along a line perpendicular to assumed block edges, the spatial difference profile representing differences between values of pixels spaced spatially in a direction parallel to said line;
summing the spatial difference profile in a direction perpendicular to said line to form a summation difference profile having values $y_n$ where n represents pixel position in units of pixel pitch perpendicular to the direction of summation;
measuring inter-maxima distances in said spatial difference profile to a fractional precision in pixel spacing units; and
aggregating measured inter-maxima distances to determine a block size;
wherein the step of measuring inter-maxima distances in said spatial difference profile comprises the step of using a moment based detector taking at least values $y_{n-2}$; $y_{n-1}$; $y_n$; $y_{n+1}$ and $y_{n+2}$ to detect peaks to a fractional precision in pixel spacing units.

2. The method according to claim 1 in which the step of aggregating measured inter-maxima distances comprises histogramming the differences.

3. The method according to claim 1 in which an analysis is conducted for missing peaks according to an interim detected block size.

4. The method according to claim 1 in which the said spatial difference profile is generated by a high-pass filter or band-pass filter.

5. The method according to claim 1, in which at least a second spatial difference profile is additionally provided, the second spatial difference profile representing differences between values of pixels spaced by a greater distance spatially in a direction parallel to said line.

6. A method according to claim 5, in which use of a first or second spatial difference profile is selected according to confidence in a determined block size.

7. Apparatus for analysing image data to quantify prior block-based processing of the data, comprising:
a first filter for processing a set of pixel values derived from said image data to generate a first spatial difference profile along a line perpendicular to assumed block edges, the first spatial difference profile representing differences between values of pixels spaced spatially in a direction parallel to said line;
a second filter for processing a set of pixel values derived from said image data to generate a second spatial difference profile along a line perpendicular to assumed block edges, the second spatial difference profile representing differences between values of pixels spaced spatially in a direction parallel to said line by a distance which is greater than the corresponding distance in the first spatial difference profile;
an accumulator for summing the first and the second spatial difference profile in a direction perpendicular to said line to form first and second summation difference profiles having values $y_n$ where n represents pixel position in units of pixel pitch perpendicular to the direction of summation;
a peak detector and distance measurement block for measuring inter-maxima distances in said summed spatial difference profiles to a fractional precision in pixel spacing units;
an aggregator for aggregating measured inter-maxima distances; and
a block size determinator operating on said aggregated measured inter-maxima distances to determine a block size;
wherein use of the first or second spatial difference profile is selected according to confidence in a determined block size.

8. Apparatus according to claim 7 in which the peak detector comprises a moment based detector to detect peaks to a fractional precision in pixel spacing units.

9. Apparatus according to claim 7 in which the aggregator serves to histogram the differences.

10. Apparatus according to claim 7 in which the peak detector is configured to conduct an analysis for missing peaks according to an interim detected block size.

11. Apparatus according to claim 7 in which said first filter is a high-pass filter or band-pass filter.

12. A non-transitory computer readable medium containing instructions causing a computer to perform a method of analysing image data to quantify prior block-based processing of the data, the method comprising the steps of:
processing a set of pixel values derived from said image data to generate a spatial difference profile along a line perpendicular to assumed block edges, the spatial difference profile representing differences between values of pixels spaced spatially in a direction parallel to said line;
summing the spatial difference profile in a direction perpendicular to said line to form a summation difference profile having values $y_n$ where n represents pixel position in units of pixel pitch perpendicular to the direction of summation;
measuring inter-maxima distances in said spatial difference profile to a fractional precision in pixel spacing units; and
aggregating measured inter-maxima distances to determine a block size;

wherein the step of measuring inter-maxima distances in said spatial difference profile comprises the step of using a moment based detector taking at least values $y_{n-2}$; $y_{n-1}$; $y_n$; $y_{n+1}$ and $y_{n+2}$ to detect peaks to a fractional precision in pixel spacing units.

13. The medium according to claim 12 in which the step of aggregating measured inter-maxima distances comprises histogramming the differences.

14. The medium according to claim 12 in which an analysis is conducted for missing peaks according to an interim detected block size.

15. The medium according to claim 12 in which the said spatial difference profile is generated by a high-pass filter or band-pass filter.

16. The medium according to claim 12, in which at least a second spatial difference profile is additionally provided, the second spatial difference profile representing differences between values of pixels spaced by a greater distance spatially in a direction parallel to said line, and in which use of a first or second spatial difference profile is selected according to confidence in a determined block size.

17. The method according to claim 1 in which the step of using a moment based detector to detect peaks to a fractional precision in pixel spacing units generates a peak position F according to F=N/S where:

$$N=(n-2)y_{n-2}+(n-1)y_{n-1}+(n)y_n+(n+1)y_{n+1}+(n+2)y_{n+2}$$

$$S=y_{n-2}+y_{n-1}+y_n+y_{n+1}+y_{n+2}.$$

18. Apparatus according to claim 7 in which in which the peak detector comprises a moment based detector taking at least values $y_{n-2}$; $y_{n-1}$; $y_n$; $y_{n+1}$ and $y_{n+2}$ to detect peaks to a fractional precision in pixel spacing unit.

19. The medium according to claim 12 in which the step of using a moment based detector to detect peaks to a fractional precision in pixel spacing units generates a peak position F according to F=N/S where:

$$N=(n-2)y_{n-2}+(n-1)y_{n-1}+(n)y_n+(n+1)y_{n+1}+(n+2)y_{n+2}$$

$$S=y_{n-2}+y_{n-1}+y_n+y_{n+1}+y_{n+2}.$$

\* \* \* \* \*